J. JONAS.
VAPOR ELECTRIC RECTIFIER.
APPLICATION FILED AUG. 1, 1914.

1,316,484. Patented Sept. 16, 1919.

WITNESSES
G. M. Hamilton
C. E. Parsons

INVENTOR
Julius Jonas.
BY
Spear, Middleton, Donaldson & Spear
ATTORNEYS

UNITED STATES PATENT OFFICE.

JULIUS JONAS, OF BADEN, SWITZERLAND, ASSIGNOR TO AKTIENGESELLSCHAFT BROWN BOVERI & CIE., OF BADEN, SWITZERLAND.

VAPOR ELECTRIC RECTIFIER.

1,316,484.   Specification of Letters Patent.   Patented Sept. 16, 1919.

Application filed August 1, 1914. Serial No. 854,457.

*To all whom it may concern:*

Be it known that I, JULIUS JONAS, a subject of the German Emperor, and residing at Bruggerstrasse 22, Baden, Switzerland, have invented certain new and useful Vapor Electric Rectifiers, of which the following is a specification.

This invention relates to vapor electric rectifiers, their arrangement and operation. In order to stop the passage of current in one direction through a cell comprising a vacuum vessel fitted with electrodes, it has hitherto been the practice to make one of the two electrodes of mercury and produce the arc in mercury vapor. If the temperature of the other electrode is kept below certain values, the cell shows the desired electrical valve action. A rectifier of this kind, however, is not controllable and consequently the direction of passage of the current cannot be changed at will. Furthermore, the proper action of such a rectifier depends upon many different preliminary conditions, the presence of which cannot be always secured with certainty. Thus for instance, the temperature of the anode must be neither too high nor too low and the vacuum must always be kept below the critical pressure as otherwise what is known as "back-lighting" takes place which means a short circuiting of the system.

The invention has for its object to provide a readily controllable electric rectifier arrangement free of these disadvantages.

The invention in brief consists in a vapor electric rectifier arrangement including a rectifier cell containing an anode, a mercury or like cathode and electrically conductive vapor with means for applying alternating current thereto and electromagnetic means disposed periodically to quench an arc formed between the anode and the cathode according to the periodicity of the exciting current.

The invention also consists in an arrangement of this kind in which the electromagnetic means are excited in part by direct current and in part by alternating current.

The invention further consists in an arrangement comprising a plurality of rectifier cells in which the electromagnetic means are applied to only some of the cells, the remainder being uncontrolled electromagnetically.

In order then to obtain a definite wave frequency according to the present invention, the magnet may be excited with an alternating current, the period of which is equal to one-half the period of the waves produced. If the electrode of the rectifier cell be connected up to a continuous current voltage, the resulting arc is interrupted each time the magnetic field exceeds a certain value. With adequate dimensions of the magnet this takes place twice during each period, so that the number of the interruptions and therefore the number of the current waves is equal to twice the frequency of the exciting current or in other words to the number of current waves per second. The number of interruptions per second can, however, be made equal to the periodicity of the exciting current if the magnet is excited both by alternating current and by direct current. In this case the magnet field has in one period only one maximum, while the direct current ampere turns are equal to the amplitude of the alternating current ampere turns. The arc will thus be interrupted only once during each period of the exciting current.

It is, however, extremely important that the interrupted arc should strike again with certainty and within an extremely short time when the magnet field exceeds the limit value and in order to secure this we may employ mercury electrodes as used in the known way for rectifiers. Whereas, however, in known rectifiers the arcs of various anodes are produced in the same space so that, with a certain displacement in time of the phases of the two arcs the electrodes continue to be active even when they are without current, with the rectifier according to the present invention the arcs of different electrodes if displaced in phase, must not pass through the same space, because magnetic extinction in this case would be rendered extremely difficult. Should this arrangement be desired, however, it would be expedient to use auxiliary electrodes which could not be acted upon by the control magnets and could serve the purpose of continuously exciting the principal electrodes.

Referring to the accompanying diagrammatic drawings.

Figure 1:
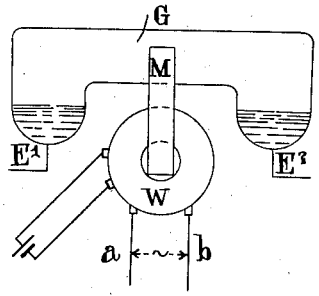
Figure 1 shows one arrangement of rectifier cell and quenching magnet according to the present invention.

In carrying the invention into effect in the form indicated in Fig. 1 a vacuum vessel G is provided with the two mercury electrodes $E_1$ and $E_2$. M is the blow-out magnet, the exciting winding W of which is excited by the alternating current system $a$ $b$. If the electrodes $E_1$ and $E_2$ are connected with a direct current system, the number of current waves flowing per unit time through the cell is equal to twice the frequency of the system $a$ $b$.

In order to extinguish the arc with certainty an edge may be provided, made, if need be, of non-conductive and non-combustible material, arranged vertical to the axis of the arc, against which the arc is blown by the blow-out magnet. This edge contributes materially to reliable interruption. As the arc must be encompassed as far as possible by the poles of the blow-out magnet, it is of advantage to allow the magnet to act on the arc in the vicinity of the electrodes, because here the extent of the arc is smallest. The vacuum vessel running horizontally between the electrodes, may also be narrowed in the middle and the magnet allowed to act on the light arc at this point. If the condensation space for the mercury vapor is fitted at this point, it will be of advantage to blow the arc in this space, sending it against suitably fitted edges.

Owing to this method of periodical interruption of current, the cell is rendered controllable because the magnitude, direction and phase of the current waves is affected according to magnitude and phase of the exciting current.

Figure 2:
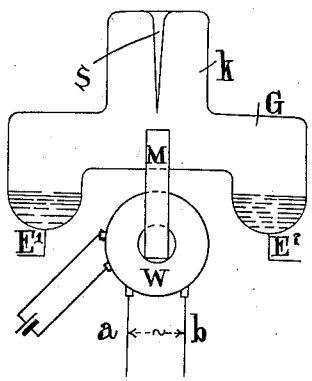
Fig. 2 shows a modification in which a depending cutting edge is employed.

Such an arrangement is indicated in Fig. 2 in which there is provided at the middle narrowed part of the vessel G, the condensation space for the vaporized mercury. In this space is the cutting edge S against which the arc is blown by the magnet. The magnet may be so excited that it only blows out the arc when it forces it against the edge S. In this case the frequency of the current waves flowing through the cell is equal to the frequency of the exciting alternating current.

The temperatures occurring inside such a rectifier cell are exceedingly high and it is therefore advisable to allow only the poles of the magnet to project into the hollow space of the cell, while the yoke and the winding of the magnet are arranged outside the vessel.

Figure 3:
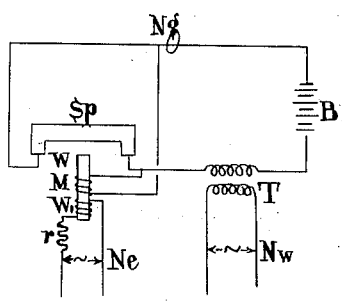
Figs. 3 and 4 show arrangements employing mixed excitation.

In Fig. 3 a mixed excitation of the magnet coil is employed, $Sp$ denoting the rectifier cell and M the magnet with the exciting windings W and W'. B is a battery, T a transformer inductively connecting up the direct current system $Ng$ with the alternating current system $Nw$. The exciting winding W is excited by the system $Ng$, the winding W' by the alternating current system $Ne$. The number of current waves per second produced by periodical interruption of the direct current is equal to the frequency of the exciting system $Ne$, as in this case each period of the exciting alternating current only corresponds to one field maximum. The alternating current transmitted through the transformer to the system $Nw$ has the same frequency as the exciting system $Ne$ and can therefore also feed the exciting winding W' from the system $Nw$ if desired, so that the two alternating currents ($Ne$ and $Nw$) may be connected in parallel to the same net.

By means of this arrangement a battery may, if desired, be charged from an alternating current system through a transformer if the blow-out or quenching magnet is excited by the alternating current voltage in question. In this case the magnet M besides receiving the alternating current excitation should also receive a direct current excitation, so that each period of the alternating current corresponds to only one field maximum. In order, however, that the field maximum should always coincide for instance with the positive current maximum, provision should be made for having the magnetizing current of the magnet as nearly as possible in phase with the voltage of the system. This might be effected by interposing a relatively high ohmic resistance in the exciting circuit of the blow out magnet as shown in Fig. 3.

Figure 4:
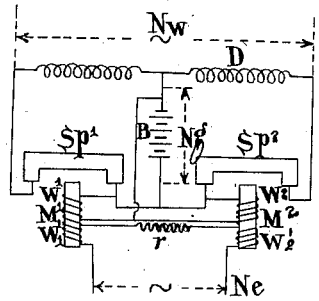
Figure 6:
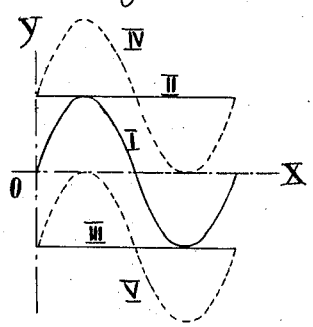
Fig. 6 is an explanatory diagram.

While in the arrangement shown in Fig. 3 a half wave of alternating current is always suppressed by the action of the blow-out magnet, if two such rectifier cells be used according to Fig. 4, this wave of alternating current may be turned to account for charging a battery. The two blow-out magnets are then excited by shifting their field maxima by 180° in time. The windings $W_1$ and $W_2$ illustrated are reversely wound and connected in parallel across the battery B. The windings W' and $W^2$ are connected in series across alternating current mains $Ne$. There thus are obtained for the strengths of the magnet field values represented by the curves shown in Fig. 6.

In this figure I represents the field excitation strength due to the alternating current for both blow-out magnets, curves II and III represent the field excitation strengths due to direct current for the two magnets. There results in the first magnet a number of exciting ampere turns according to curve IV, and in the other magnet that according to curve V and since the strength of the magnetic fields (neglecting saturation effects) may be assumed proportional to the excitation, curves IV and V also represent instantaneous values of the field intensity and it is perceived that the maxima thereof are shifted by 180°.

In the arrangement indicated in Fig. 4, B denotes the battery (or other direct current storage means for instance a direct current machine with a flywheel) and D is a balancing transformer which can be made as a single coil or two-coil transformer.

$Sp_1$ and $Sp_2$ are rectifier cells, $M_1$ and $M_2$ the corresponding blow-out magnets. The windings $W_1$ and $W_2$ of the magnets $M_1$ and $M_2$ are excited by direct current from the battery, while the windings $W_1'$ and $W_2'$ can be connected in series through an ohmic resistance $r$ if desired in connection with the voltage of the alternating system $Ne$, but neither in Fig. 3 nor in Fig. 4 is such resistance essential. It is preferable to have these windings excited by a voltage displaced 90° in relation to that of the system, for instance the voltage of the system $Ne$, so that the correct phase of the magnet fields is insured. If then the maxima of the fields of $M_1$ and $M_2$ be displaced 180° relatively to each other in point of time, one of the two cells will stop the current when the other sets it free. The direction in which the current flows in the main circuit, whether it be from the battery to the transformer D or from the transformer to the battery depends upon which voltage happens to prevail. The chief point to be noted is that the passage of current is always open in that circuit in which the direct current and alternating current voltages counteract each other whereas passage of current is stopped in the circuit in which they assist each other.

Figure 5:
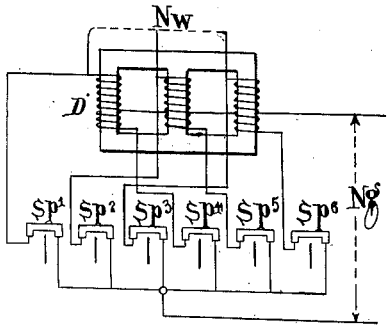
Fig. 5 illustrates a polyphase arrangement.

In the case of polyphase currents for instance three-phase current, the excitation of the blow-out magnets by the correct voltage may be effected without further auxiliaries, because the ends of the exciting winding of the magnets for phase I are connected up to the external conductors of phases II and III. One arrangement for converting three-phase current into direct current or vice versa will now be described with reference to Fig. 5.

One pole of the battery or other direct current system $Ng$ is connected to the neutral point of a (say 6-phase) choking coil apparatus D connected up to the three-phase system $Nw$ (or the secondary winding of a three-phase transformer), while the other pole is connected by way of rectifier cells $Sp_1$ to $Sp_6$, to the outside conductors of the three-phase system or the ends of D. The blow-out magnets are excited in the above manner and in action at any instant the particular cell laid open for the passage of current is that in the circuit wherein the battery voltage is directed against the alternating current voltage.

Applications of the methods and arrangements described are extremely numerous. For example in addition to the application already mentioned for the mutual working of a direct current and alternating current system, the conversion of alternating current into direct current may also be employed for a number of other purposes. Wherever transformation of alternating current into the direct current is desired or wherever periodical changes of resistance of an electric circuit are to be produced, rectifier cells and their arrangements according to the present invention may advantageously be employed.

Having now described my invention what I claim as new and desire to secure by Letters Patent is:—

1. In vapor electric rectifiers a containing vessel, electrodes and an electrically conductive vapor in said vessel, leads applying an alternating voltage to said vapor, magnetic normal intensity arc quenching means, direct current exciting means therefor and alternating current exciting means therefor, said exciting means being adapted periodically to quench an arc formed in said vapor, quenching being effected according to the periodicity of exciting current supplied to said electromagnetic means.

2. A method of operating a vapor electric rectifier connecting a direct current circuit with an alternating current circuit which consists in exciting a quenching magnet by the alternating current under rectification and also by direct current and applying the resultant field to determine current flow through the rectifier to the rectified current.

In testimony whereof, I have affixed my signature in presence of two witnesses.

JULIUS JONAS.

Witnesses:
 CARL GUBLER,
 AUGUST KRUGG.